Dec. 13, 1949 — E. J. ANDERSON ET AL — 2,491,069
SNATCH BLOCK
Filed May 12, 1947 — 2 Sheets-Sheet 1
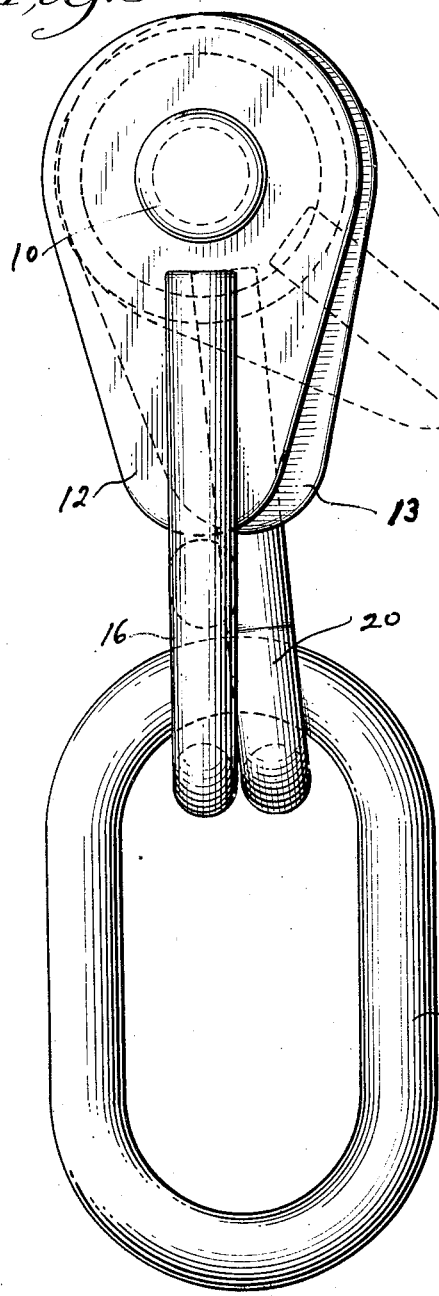
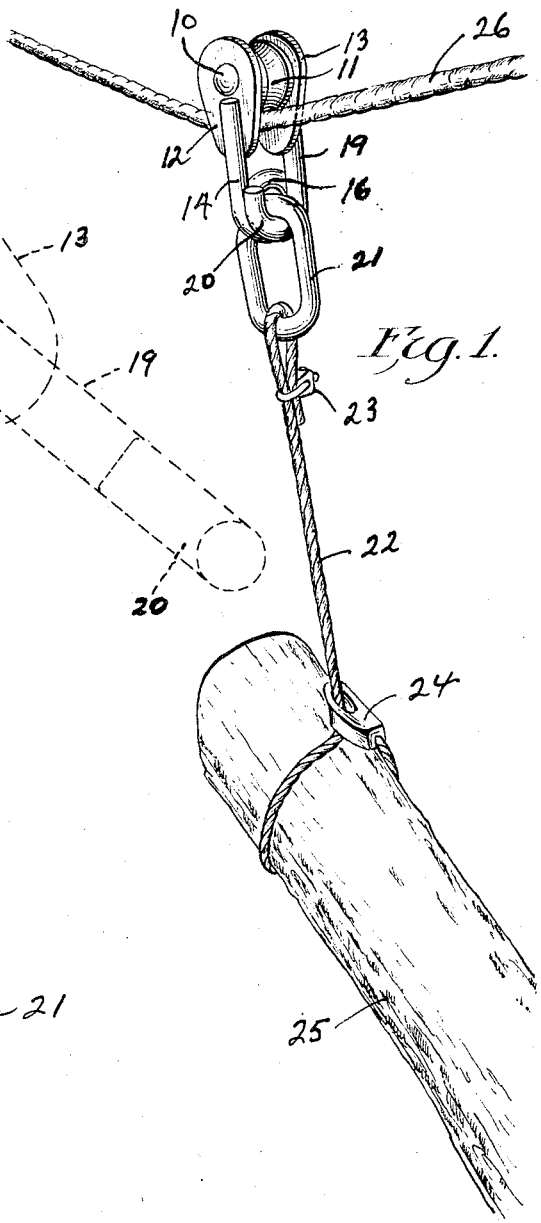
Inventors:
Edward J. Anderson
Eino Lehto and
Matt Saari
By Joseph Rossman
Atty.

Dec. 13, 1949  E. J. ANDERSON ET AL  2,491,069
SNATCH BLOCK

Filed May 12, 1947  2 Sheets-Sheet 2

Inventors:
Edward J. Anderson,
Eino Lehto and
Matt Saari
By Joseph Rosoman Atty.

Patented Dec. 13, 1949

2,491,069

UNITED STATES PATENT OFFICE 2,491,069

SNATCH BLOCK

Edward J. Anderson, Houghton, and Eino Lehto and Matt Saari, Aura, Mich., assignors to Marathon Corporation, Rothschild, Wis., a corporation of Wisconsin Application May 12, 1947, Serial No. 747,476

2 Claims. (Cl. 254—194)

The invention relates to improvements in snatch blocks.

One of the objects of the invention is to provide a snatch block which is simple in construction and which is inexpensive to produce.

Another object is to provide a snatch block which in use will automatically assume improved locking characteristics.

Other objects and advantages of the present invention will more fully appear from the following description and drawings, wherein:

Figure 1 is a perspective view of the improved snatch block illustrating one manner of use, namely in logging operations;

Figure 3 is a vertical side view of the snatch block; and

Figure 4:
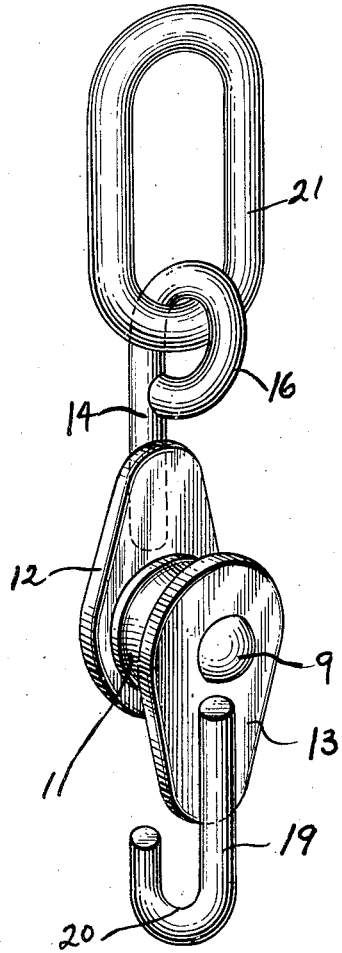
Figure 4 is a perspective view of the snatch block illustrating the hooking element in open position to allow the insertion of a cable or rope upon the sheave.

Referring to the drawings, the snatch block comprises an axle pin 8 peened over at its ends 9 and 10 to confine a sheave 11 and side wings 12 and 13 on each side of said sheave. The side wings 12 and 13 and the sheave 11 are mounted to freely rotate about the axle pin 8. A rod or arm 14 is fixedly secured to the side wing 12 as by welding 15. Preferably the rod 14 is welded to side wing 12 throughout the entire area of contact to insure maximum strength. The rod 14 is bent back onto itself to form a ring 16 disposed inwardly of the side wing 12 under the sheave 11 and in a plane perpendicular to the axis of axle pin 8. To insure that the ring 16 will withstand the maximum in tension without opening, the end of the rod 14 is welded at 17 to an area of said rod below the side wing 12.

Figure 2:
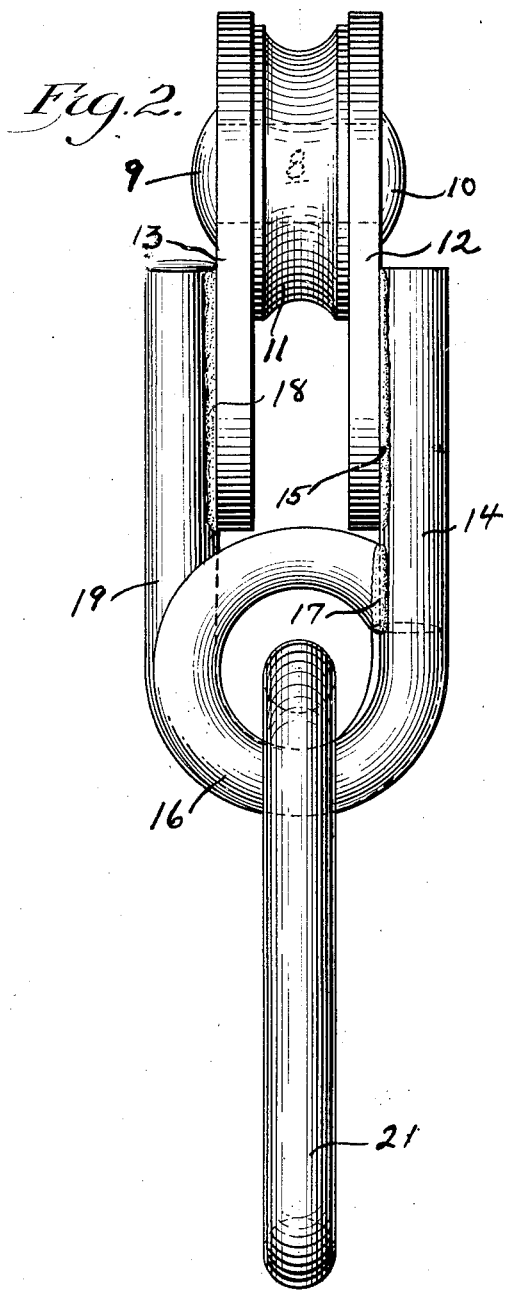
Figure 2 is a vertical front view of the snatch block.

The side wing 13 has fixedly secured thereto by welding 18 a rod or arm 19. Beyond the area of contact and adherence with the side wing 13, the rod 19 is formed or bent into a hook 20. As shown in Figures 1, 2 and 3 the rods 14 and 19 are constructed and dimensioned so that the hook position 20 has the same radius or curvature as the ring 16 so that the hook in effect duplicates a substantial segment of the ring when they are in juxtaposition. The ring 16 has disposed therein in linking relationship a link 21, preferably of metal. The hook 20 is of such selected length that by pushing the link 21 upwards in contact with the ring 16, the hook 20 can clear said link and be pivoted to unlocked position whereby the sheave is exposed.

Figure 4 illustrates the snatch block in the position preparatory to the insertion of the inner reach of a rope or cable. The side wing 13 is swung to its open position to allow the inner reach of a rope or cable 26 to be placed directly onto the sheave. This is also indicated in the dotted lines of Figure 3.

Figure 1 shows a rope 26 disposed on the sheave and the side wing 13 down in operable position so that the hook 20 of rod 19 engages the link 21 and is in contiguous relationship with the ring 16 for closed and locking engagement with said link. A rope 22 may be looped about the link 21 and secured thereto by a fastening member 23. The other end of the rope 22 is fastened to an eye member 24 through which the rope 22 is threaded to enable securing a log 25 or any other article desired to be hauled.

It will be observed that as tension is applied to the snatch block, the hook 20 will assume increased or improved locking characteristics. If it is desired to obtain access to the sheave to dispose an inner reach of a rope or cable thereon, it is simply necessary to release the tension on the snatch block and swing the side wing 13 with the hook 20 thereon out of contact with the link 21 and ring 16. This is illustrated in Figure 3 in the dotted lines and in Figure 4.

It is within the scope of the invention to utilize any looped or closed member in lieu of the link 21. For example, the same results may be obtained by looping the rope 22 through the ring 16.

The snatch block is preferably constructed of steel high in tensile strength.

If desired the sheave may be mounted on roller bearings whereby provision is made to allow lubrication of the axle pin.

The snatch block made in accordance with the present invention has many advantages over prior constructions. It assures secure locking and retention of the cable during hauling operations. As tension increases on the drag cable the hook portion tends to lock the more securely so that accidental unlocking cannot possibly occur. As long as the cable is under tension there is no possibility of the hook portion unlocking even if the snatch block should drag on the ground. The parts of the snatch block can be made with a minimum of materials and labor. The ring and hook portion are readily formed from the members extending from the side wings by merely shaping the ends thereof without involving extensive machining or casting operations. It will therefore be evident that the construction is very simple, efficient, sturdy and dependable as no special locking parts are required to coact with the hook portion. The cost of manufacturing the present snatch block is thus very low. There are so few parts that no special care or maintenance is required for continuous use of the snatch block in logging or other like operations.

The present invention may be embodied in other specific forms without departing from the essential attributes thereof. It is desired that the present specific embodiment be considered in all respects as illustrative and not restrictive, reference being had to the appended claims rather than to the aforegoing description to indicate the scope of the invention.

We claim:

1. A snatch block comprising an axle, a sheave rotatably mounted on said axle, a side wing disposed on one side of said sheave and mounted on said axle, a metallic member welded to said side wing and having a ring formed therein, said ring being disposed inwardly of said side wing and in a plane perpendicular to the axis of said axle, a link disposed within said ring, another side wing pivotally mounted on said axle and on the other side of said sheave, a metallic member welded to said side wing and having a hook formed therein, said hook having substantially the same radius as said ring and adapted to lock about said link.

2. A snatch block comprising an axle, a sheave rotatably mounted on said axle, a side wing disposed on one side of said sheave and mounted on said axle, a member extending from said side wing, the end of said member being formed into a ring, said ring being disposed inwardly of said side wing and in a plane perpendicular to the axis of said axle, a closed link freely passing through said ring, another side wing pivotally mounted on said axle and on the other side of said sheave, a member extending from said side wing and having the end thereof formed into a hook, said hook having substantially the same radius as said ring and adapted to lock about said closed link.

EDWARD J. ANDERSON.
EINO LEHTO.
MATT SAARI.

REFERENCES CITED

The following references are of record in the file of this patent:

UNITED STATES PATENTS

| Number | Name | Date |
|---|---|---|
| 713,929 | Webster | Nov. 18, 1902 |
| 1,436,348 | Le Clair | Nov. 21, 1922 |
| 2,187,268 | Hill | Jan. 16, 1940 |